US007422408B2

(12) United States Patent
Sobota et al.

(10) Patent No.: US 7,422,408 B2
(45) Date of Patent: Sep. 9, 2008

(54) LIGHTED VEHICLE ACCESS SYSTEM AND METHOD

(75) Inventors: Elizabeth Sobota, Rochester, IN (US); Kenneth Thornburg, Culver, IN (US); Jerome P. Sobota, Rochester, IN (US)

(73) Assignee: The Braun Corporation, Winamac, IN (US)

( * ) Notice: Subject to any disclaimer, the term of this patent is extended or adjusted under 35 U.S.C. 154(b) by 383 days.

(21) Appl. No.: 11/186,441

(22) Filed: Jul. 21, 2005

(65) Prior Publication Data

US 2006/0045671 A1 Mar. 2, 2006

Related U.S. Application Data

(60) Provisional application No. 60/589,620, filed on Jul. 21, 2004.

(51) Int. Cl.
*B60P 1/02* (2006.01)

(52) U.S. Cl. ........................ 414/546; 414/921; 362/481

(58) Field of Classification Search .................. 362/481
See application file for complete search history.

(56) References Cited

U.S. PATENT DOCUMENTS

| | | | | |
|---|---|---|---|---|
| 1,136,583 | A * | 4/1915 | Blake | 362/481 |
| 2,208,883 | A * | 7/1940 | Hall | 362/119 |
| 3,934,134 | A * | 1/1976 | Wassel | 362/549 |
| 4,224,657 | A * | 9/1980 | Olson | 362/485 |
| 5,486,082 | A * | 1/1996 | Feldman et al. | 414/542 |
| 5,755,309 | A * | 5/1998 | Harman et al. | 187/200 |
| 6,257,823 | B1 * | 7/2001 | Kosta | 414/563 |
| 6,729,829 | B2 * | 5/2004 | Zimmer | 414/522 |
| 2005/0238471 | A1 * | 10/2005 | Ablabutyan et al. | 414/546 |

OTHER PUBLICATIONS

Federal Motor Vehicle Safety Standards; Platform Lift Systems for Accessible Motor Vehicles; Platform Lift Installation on Motor Vehicles; Final Rule, Federal Register, Dec. 27, 2002, pp. 79427 and 79443, vol. 67, No. 249, Department of Transportation National Highway Traffic Safety Administration.

* cited by examiner

*Primary Examiner*—James Keenan
(74) *Attorney, Agent, or Firm*—Michael Best & Friedrich LLP

(57) ABSTRACT

A lighted vehicle access apparatus and method are disclosed, wherein one or more lights coupled to a movable platform are positioned to illuminate the platform. In some embodiments, the lights are in a fixed position with respect to the platform (and therefore movable with respect to the vehicle), while in other embodiments, the lights are movable with respect to the platform in movement of the platform between stowed and deployed positions and/or between raised and lowered positions with respect to the vehicle. The lights can be coupled to one or more arm assemblies of the vehicle access apparatus, to one or more handles of the vehicle access apparatus, or in other locations. Also, the lights can be electroluminescent light elements, bulbs, or other types of light-emitting devices.

19 Claims, 15 Drawing Sheets

LIGHTED VEHICLE ACCESS SYSTEM AND METHOD

CROSS-REFERENCE TO RELATED APPLICATIONS

Priority is hereby claimed to U.S. Provisional Patent Application Ser. No. 60/589,620 filed on Jul. 21, 2004, the entire contents of which are incorporated herein by reference.

BACKGROUND

Numerous devices exist for assisting individuals having reduced mobility into and out of vehicles. Such devices include without limitation lifting platforms, ramps, moving seats, movable steps, and the like mounted to a vehicle in any conventional manner. For example, some devices are used to lift and lower standing individuals or individuals in wheelchairs, or to move individuals in other manners with respect to a vehicle. As another example, some devices are used to enable stretchers or beds to be loaded onto and/or unloaded from vehicles. As yet another example, some devices can be positioned in different manners to permit easier entry and exit of individuals into and out of vehicles. Such devices include ramps and steps that can be moved to different positions with respect to the vehicle.

Despite advances in vehicle access technology, some impediments to vehicle entry and exit still exist for individuals with reduced mobility. One such impediment is the ability of individuals to clearly see the vehicle entry and exit device. For example, in some cases, the vehicle entry and exit device may need to be used in dark conditions. As another example, the individual using the device may be blind or vision impaired, and therefore unable to see the device or parts of the device.

Vehicle entry and exit devices are often powered, typically include moving parts, and can be used in many locations and conditions. For these and other reasons, it is important for a user and/or operator to clearly see the vehicle entry and exit device (or components thereof) and its position and movement during operation. In many cases, the user or operator must rely upon light from the vehicle or from the surrounding environment in order to see the vehicle entry and exit device. However, such light can be inadequate or can be ineffective in fully illuminating the vehicle entry and exit device. Also, vehicle entry and exit devices typically include moving parts as mentioned above, therefore increasing the chances that part or all of such devices have reduced visibility in some positions.

SUMMARY OF THE INVENTION

Some embodiments of the present invention provide a vehicle access apparatus coupled to and movable with respect to a vehicle for user entry into and exit from the vehicle, the vehicle access apparatus comprising a platform, an actuator coupled to the platform and operable to move the platform with respect to the vehicle, and a light coupled to the vehicle access apparatus and positioned to illuminate at least part of the platform.

In some embodiments, a method of illuminating a platform of a vehicle access apparatus coupled to and movable with respect to a vehicle for user entry into and exit from the vehicle is provided, and comprises supplying power to a light coupled to the vehicle access apparatus, illuminating at least part of the platform with the light; moving the platform with respect to the vehicle, and moving the light while moving the platform in order to illuminate the platform.

Further aspects of the present invention, together with the organization and operation thereof, will become apparent from the following detailed description of the invention when taken in conjunction with the accompanying drawings.

BRIEF DESCRIPTION OF THE DRAWINGS

The present invention is further described with reference to the accompanying drawings, which show various embodiments of the present invention. However, it should be noted that the invention as disclosed in the accompanying drawings is illustrated by way of example only. The various elements and combinations of elements described below and illustrated in the drawings can be arranged and organized differently to result in embodiments which are still within the spirit and scope of the present invention.

DETAILED DESCRIPTION

Figure 1:
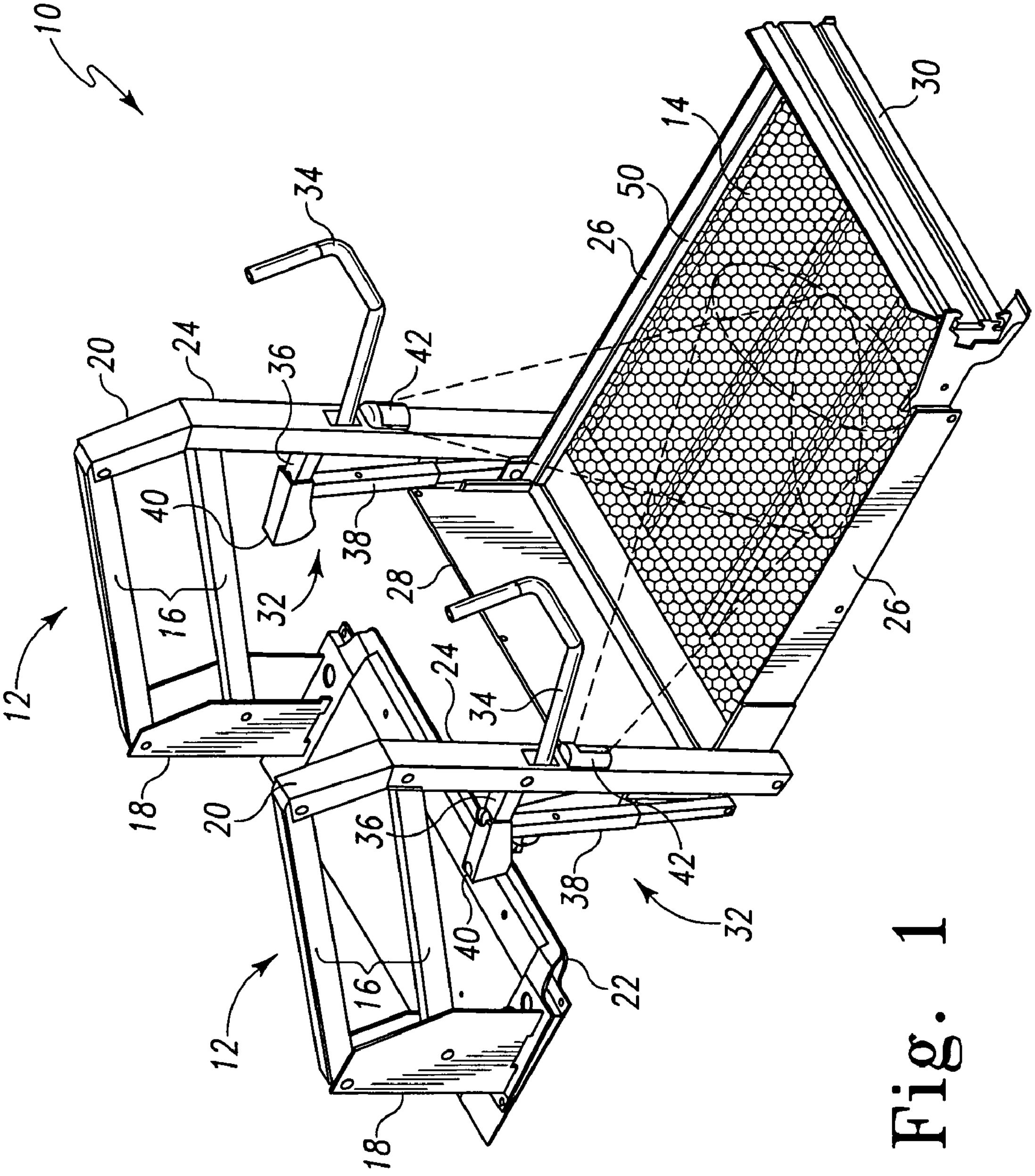
FIG. 1 is a perspective view of an embodiment of a lighted vehicle lift according to the present invention, shown in a deployed position.

An embodiment of a vehicle entry and exit device is illustrated in FIGS. 1-4. The vehicle entry and exit device in FIGS. 1-4 is a lift (indicated generally at 10) for individuals having reduced mobility. For example, the lift 10 can be used to help individuals in wheelchairs enter and exit a vehicle. The lift 10 illustrated in FIGS. 1-4 is a dual parallelogram-type lift, and will be described in greater detail below. Although the principles of the present invention are described below and illustrated in FIGS. 1-4 as applied to a dual parallelogram-type lift, these principles can be applied to any vehicle entry and exit device in which at least a portion of a platform, seat, ramp, or step coupled to a vehicle is movable to extend and retract with respect to the vehicle in order to assist users in entering and/or exiting the vehicle. By way of example only, the principles of the present invention can be employed with respect to dual or single parallelogram-type lifts (an example of which is disclosed in U.S. Pat. No. 6,238,169 issued to Dupuy et al.), under vehicle lifts (an example of which is disclosed in U.S. Pat. No. 6,398,479 issued to Dupuy et al.), single-arm lifts (examples of which are disclosed in U.S. Pat. No. 6,357,992 issued to Ringdahl et al. and U.S. Pat. No. 4,664,584 issued to Braun et al.), foldable and non-foldable access ramps, seats that are extendable and retractable with respect to a vehicle, movable step systems, and the like. Accordingly, the dual parallelogram-type lift illustrated in FIGS. 1-4 is presented by way of example only in order to describe and illustrate the principles of the present invention, and does not indicate or imply that the present invention is limited to certain types of vehicle entry and exit devices.

With reference again to FIGS. 1-4, the illustrated lift 10 has two arm assemblies 12 movable with respect to a vehicle (not shown) in order to lift and lower a platform 14 with respect to the vehicle. Each arm assembly 12 has a pair of arms 16, each of which are pivotably coupled to at least one stanchion 18 and to a link 20. Either or both arm assemblies 12 can be driven in any conventional manner, such as by a hydraulic actuator drivably connected to either or both arms 16 of an arm assembly 12. Other driving systems include without limitation electric motors, pneumatic actuators, solenoids, and the like, any of which can be drivably coupled to one or more of the arms 16 in any conventional manner. In other embodiments, any of the driving systems described above can be used to raise and lower the platform 14 in any other conventional manner.

The stanchions 18 can be mounted to a vehicle in a number of different manners well known to those in the art. In the illustrated embodiment of FIGS. 1-4 for example, the stanchions 18 are mounted to a base 22 of the lift 10, which is secured to the floor, a frame, or other portion of the vehicle. The base 22 can be secured by bolts, screws, rivets, or other conventional fasteners, by welding, brazing, adhesive or cohesive bonding material, and the like. Alternatively or in addition, the stanchions 18 can be secured directly to the vehicle in any of these manners, in which case the lift 10 need not necessarily have a base 22.

Each arm assembly 12 in the illustrated embodiment of FIGS. 1-4 also has another arm 24 extending to the platform 14. The arm 24 is pivotably coupled to the platform 14 so that the platform 14 can be pivoted between a deployed position shown in FIG. 1 and a stowed position shown in FIGS. 2 and 3.

By driving either or both arm assemblies 12 as described above, the arms 24 and the platform 14 can be moved to different vertical positions with respect to the vehicle and/or can be moved toward and away from the vehicle as is well known in the art. For example, when the arm assemblies 12 illustrated in FIG. 1 are driven in one direction (i.e., generally clockwise in FIGS. 1-3), the pairs of arms 16 are pivoted with respect to the stanchions 18 in a direction away from the vehicle and in which the arms 24 and platform 14 are lowered. When the arm assemblies 12 in this example are driven in an opposite direction (i.e., generally counterclockwise in FIGS. 1-3), the pairs of arms 16 are pivoted with respect to the stanchions 18 in a direction toward the vehicle and in which the arms 24 of the platform 14 are raised.

In some embodiments, the parallelogram-type lift 10 illustrated in FIGS. 1-4 has barriers limiting movement of individuals or objects off of the platform 14. For example, the platform can have rails 26 that extend along part or all of the sides of the platform 14, and can have inboard and outboard barriers 28, 30 that extend along part or all of the inboard and outboard ends of the platform 14. Either or both barriers 28, 30 can be movable in some embodiments, such as by one or more actuators coupled to the barriers 28, 30 in any conventional manner. In the illustrated embodiment of FIGS. 1-4, the inboard barrier 28 is pivotably coupled to an inboard end of the platform 14, and is driven between raised and lowered positions by a mechanical actuator 32 (described in greater detail below). Also in this embodiment, the outboard barrier 30 is pivotably coupled to the ends of the rails 26, and is pivotable between a blocking position as shown in FIG. 1 and a lowered position (not shown) in which the outboard barrier 30 is substantially parallel to and/or is located beneath the platform 14.

The lift 10 illustrated in FIGS. 1-4 also has a pair of handles 34 extending from the arms 24 to provide users or other individuals with locations for grasping the lift 10. Alternatively, the handles 34 can extend from any part of the lift 10, such as from the platform 14, any other part of the arm assemblies 12, and the like. The handles 34 can have any shape desired, including without limitation straight, curved, bent, and/or looped handles, handles having irregular shapes, and the like.

Figure 2:
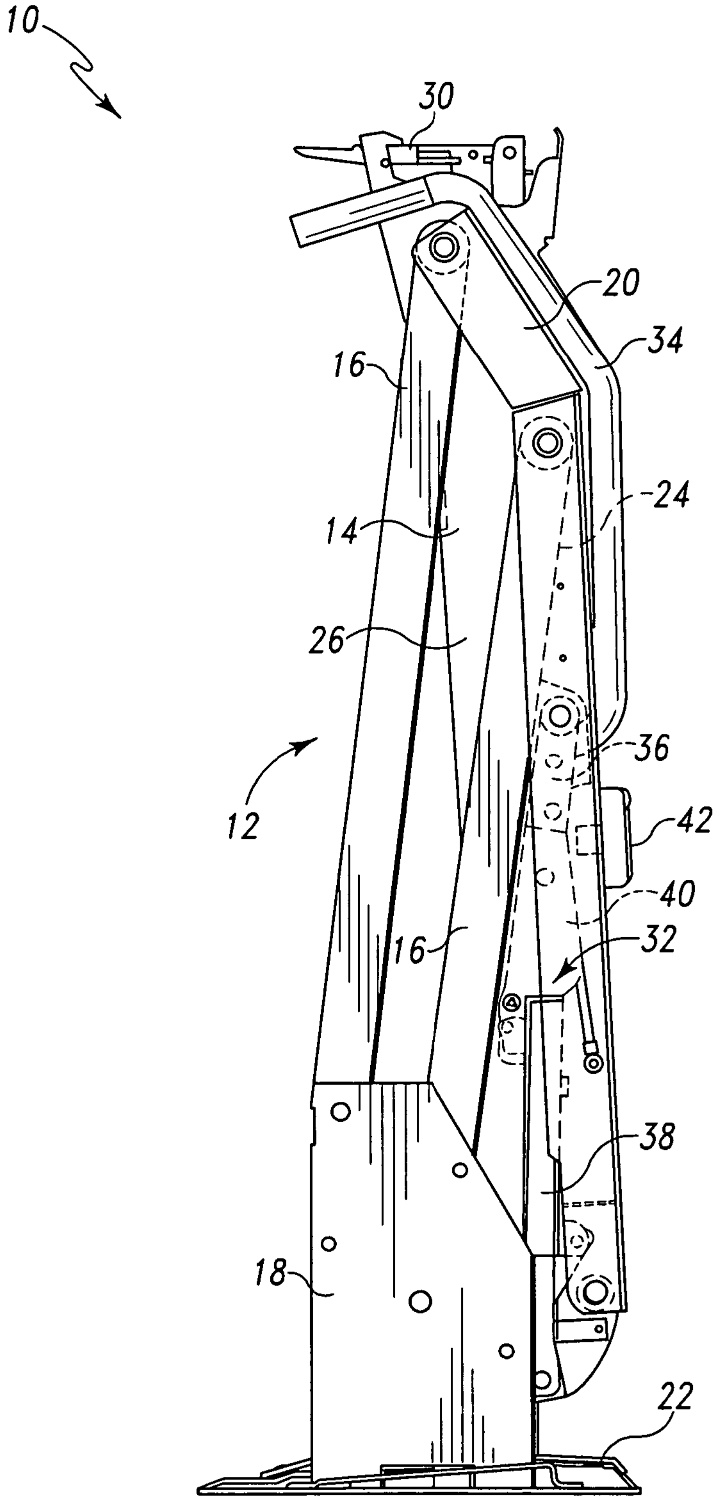
FIGS. 2 and 3 are side views of the lighted vehicle lift illustrated in FIG. 1, shown in a stowed position.
Figure 3:
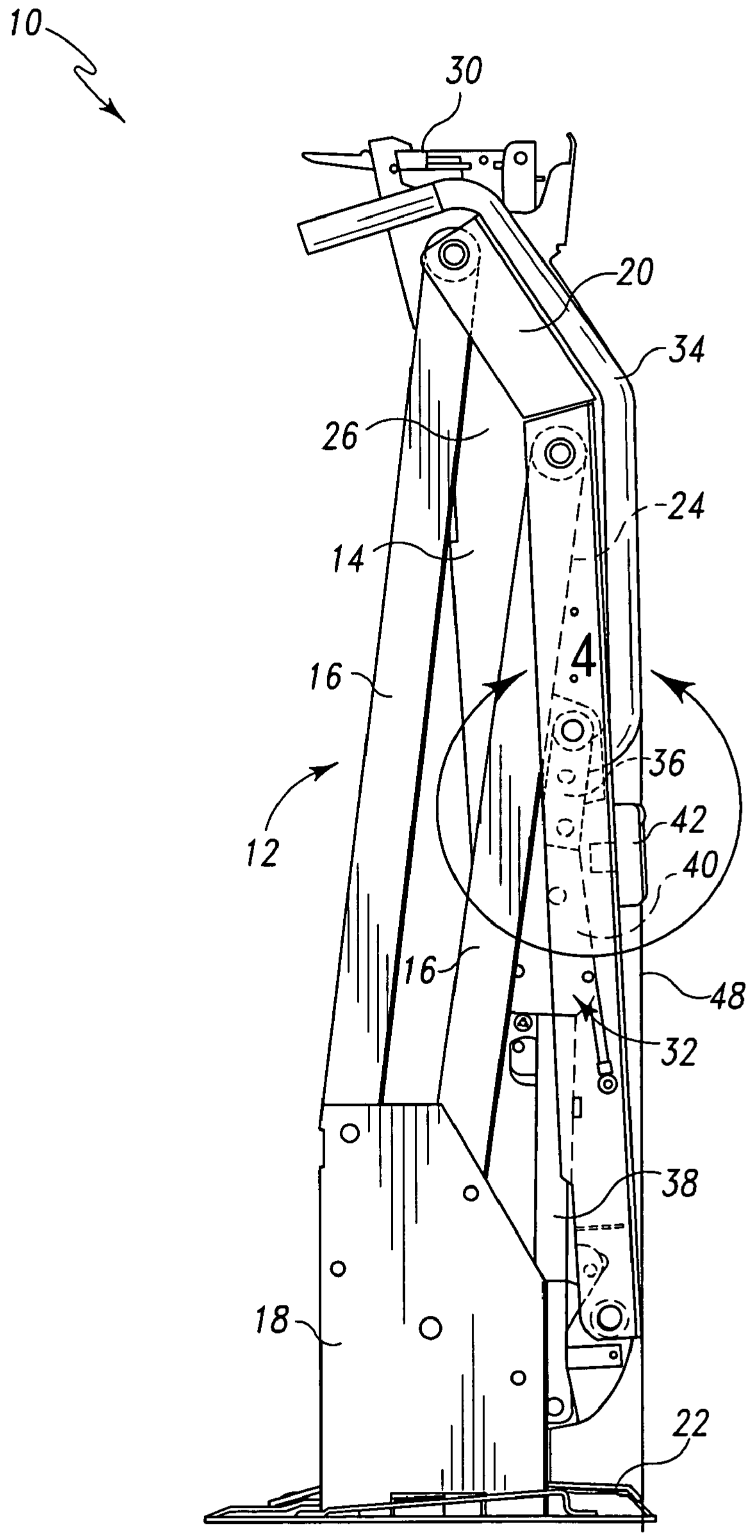
Figure 4:
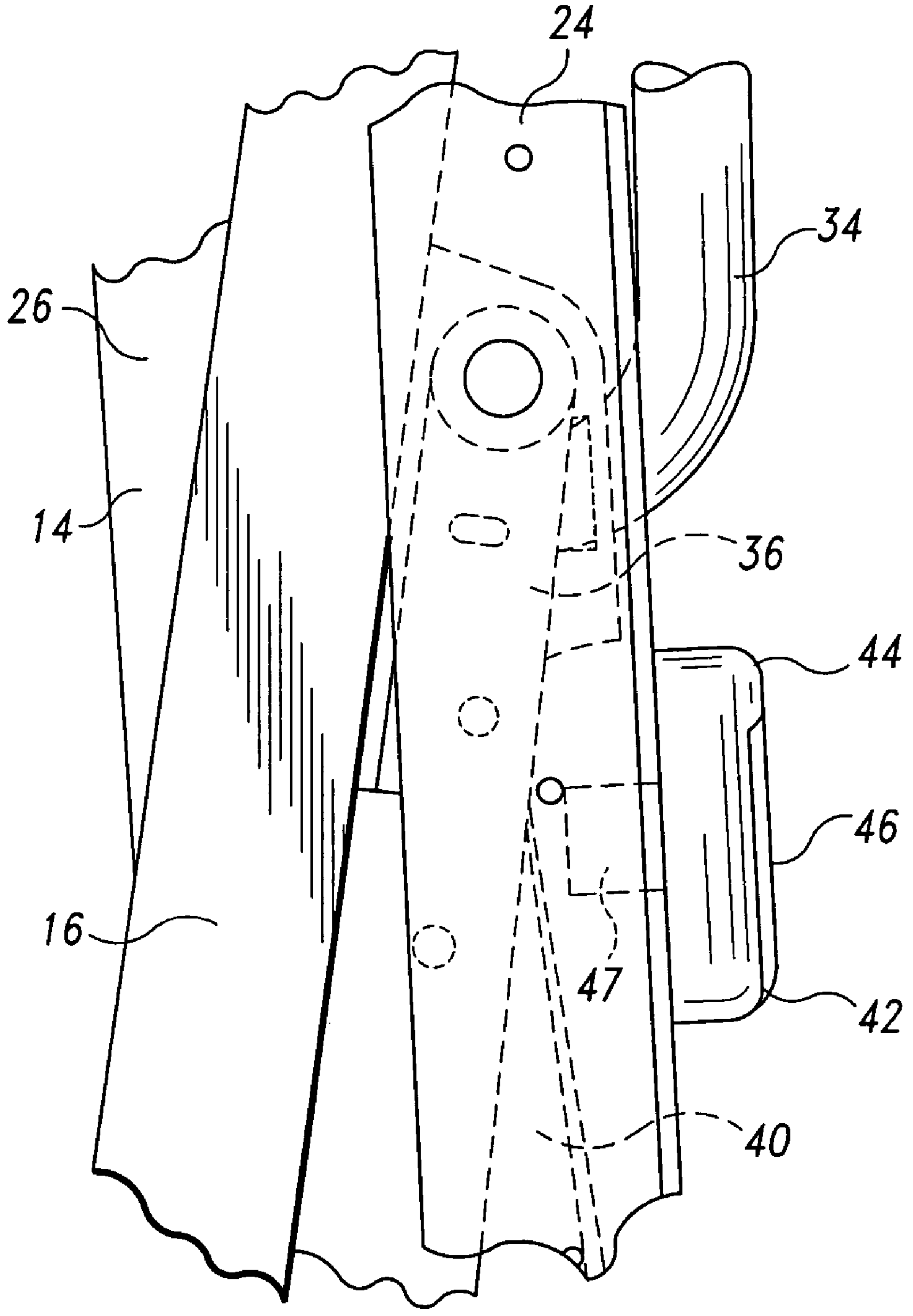
FIG. 4 is a side detail view of the lighted vehicle lift illustrated in FIGS. 1-3.

In some embodiments, the handles 34 are movable with respect to the element(s) to which they are mounted. Such movement can enable the handles 34 to be pivoted or moved in any other manner between deployed and stowed positions. In the illustrated embodiment of FIGS. 1-4, for example, each handle 34 is pivotably coupled to a respective arm 24, and extends through the arm for connection to a mechanical actuator 32. The mechanical actuator 32 in FIGS. 1-4 includes a link 36 and a telescoping strut 38 pivotably coupled together and to different locations along the arm 24. The mechanical actuator 32 also includes a cam member 40 pivotably coupled to the link 36 and telescoping strut 38, and positioned to be actuated by the arm assembly 12 when the arm 24 (and mechanical actuator 32) is raised toward a entry or transfer level, such as at the height of a vehicle floor. This motion causes the cam member 40 to lower the inboard barrier 28 by pushing the telescoping strut 38 downwardly, causes the telescoping strut 38 to shorten, and pivots the handles 34 toward stowed positions adjacent the arms 24 and links 20 as shown in FIGS. 2 and 3. Also, this motion causes the telescoping struts 38 to push upon an inboard end of the platform 14, causing the platform 14 to pivot about the lower ends of the arms 24 toward the stowed position shown in FIGS. 2 and 3.

It is often desirable for the lift 10 to occupy a minimum amount of space when in its stowed position. In the embodiment of FIGS. 1-4, for example, the arm assemblies 12, platform 14, stanchions 18, and handles 34 occupy a relatively small space that can be bounded on an outboard side (i.e., the right side as shown in FIGS. 2 and 3) by a vehicle door or other barrier.

Figure 6:
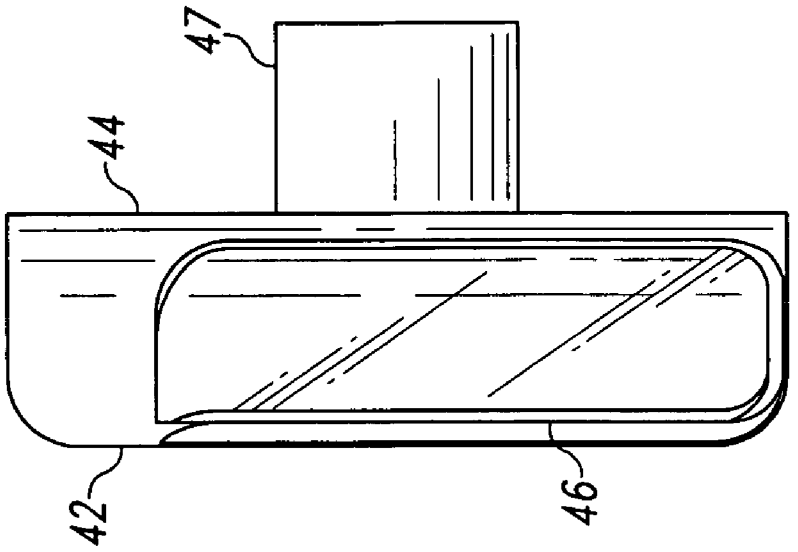
FIG. 6 is a side view of the light assembly illustrated in FIG. 5.
Figure 5:
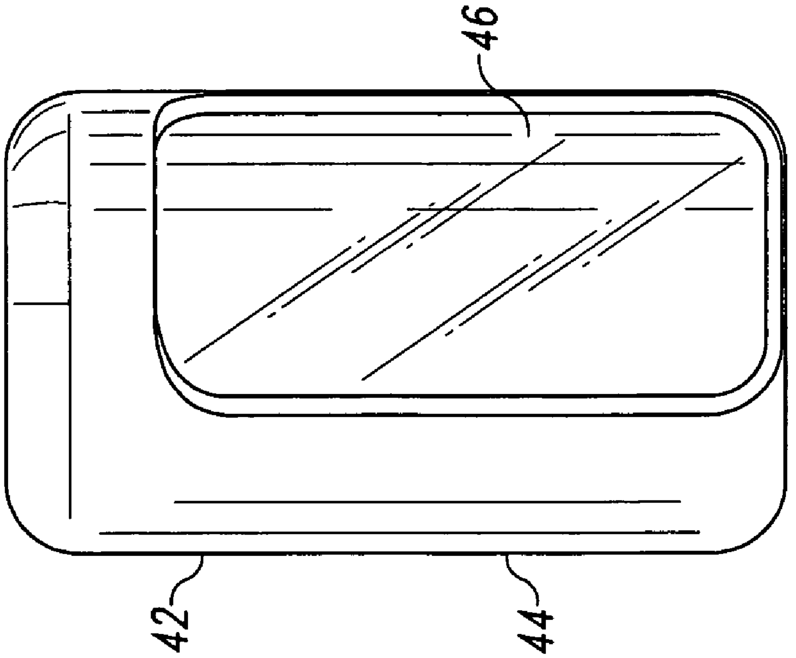
FIG. 5 is a front view of a light assembly of the lighted vehicle lift illustrated in FIGS. 1-4.

The lift 10 illustrated in FIGS. 1-4 includes two light assemblies 42 located on the arms 24 described above. Each light assembly 42 can comprise one or more lights of any type (hereinafter referred to as "light elements"), as described in greater detail below. As best shown in FIGS. 5 and 6, each light assembly 42 can have a housing 44 constructed of any material or combination of materials, such as plastic, metal, glass, composites, and the like. Also, each light assembly 42 can have one or more lenses 46 (see FIGS. 5 and 6) constructed of any transparent or semi-transparent material permitting light to exit the housing 44, including without limitation plastic, glass, composites, and the like. The lenses 46 can be colorless, substantially colorless, or can have any color desired in order to provide colored light for the lift 10.

In some embodiments, the light assemblies 42 can be adapted to cast light only in certain directions or ranges of directions. For example, the lenses 46 of the light assemblies 42 illustrated in FIGS. 1-4 can be shaped to permit light to escape the light assemblies 42 substantially only in a direction toward the platform 14 in order to concentrate the light upon the platform 14 and/or to reduce unwanted illumination of other areas around the lift 10. For example, the lenses 46 illustrated in FIGS. 1-4 extend only across a portion of a front of the housing 44, and therefore permit light to escape the housing 44 only in directions generally towards the platform 14.

Each light assembly 42 has one or more light elements (not shown) that can be located in or on the housing 44. The light elements can take any form desired, including without limitation incandescent, LED, halogen, neon, fluorescent, and other types of light bulbs. In the illustrated embodiment of FIGS. 1-4, two light assemblies 42 are mounted on the arms 24 as described above, and include incandescent bulbs (not shown) located within respective housings 44. In other embodiments, the light elements can be electroluminescent lights in any form (tape, rope, pads, and the like). Any other type of light-producing element can instead be used, and falls within the spirit and scope of the present invention.

The light assemblies 42 illustrated in FIGS. 1-6 are each supplied with power via wiring extending from each light assembly 42 to a suitable power supply. In the illustrated embodiment of FIGS. 1-6, the power supply is a battery (not shown) providing DC voltage to the light assemblies 42 via wiring (also not shown) running from the stanchions 18, through either or both hollow arms 16 of each arm assembly 12, and through the hollow arms 24 to the light assemblies 42. In other embodiments, the light assemblies 42 can be supplied with AC power in a similar manner.

With continued reference to FIGS. 5 and 6, each light assembly 42 in the illustrated embodiment has a base 47 that can be received within an aperture in the arm 24 or other lift surface to which the light assembly 42 is mounted. The base 47 can have any shape suitable for this purpose, and can be hollow or can be provided with one or more apertures through which wiring is passed for powering the light assembly 42 as described above.

In some embodiments, the light assemblies 42 of the lift 10 are located at a lower elevation than the handles 34, permitting illumination of at least part of the platform 14 without obstruction from the handles 34 (if employed). For example, the light assemblies 42 of the lift 10 illustrated in FIGS. 1-4 are positioned on the arms 24 in locations below the elevation of the handles 34 (i.e., at a lower elevation than where the handles 34 are coupled to the arms 24). The light assemblies 42 can be mounted in relatively low positions on the lift 10 to provide enhanced illumination of the platform 14 while reducing the amount of undesirable light directed toward the eyes of users and other individuals on or around the lift 10. To this end, the light assemblies 42 can be mounted on the arms 24 at a location that is lower than the handles 34 as just described, can be located at any point along the rails 26 of the platform 14, at any point along the inboard and/or outboard barriers 28, 30, on either arm 16 of either arm assembly 12 (e.g., on the lower of the two arms shown in FIG. 1), on the base 22, on the stanchions 18, on the handles 34, and the like. In other embodiments, the light assemblies 42 can be mounted in higher locations on the lift 10, such as on the arms 24 at an elevation higher than the handles 34 (i.e., at a higher elevation than where the handles 34 are coupled to the arms 24).

By virtue of their locations on the arm assemblies 12 of the lift 10, the light assemblies 42 in the illustrated embodiment of FIGS. 1-6 are substantially stationary with respect to the platform 14 when the platform 14 is moved to different elevations. In other embodiments, the light assemblies 42 are located in other positions (e.g., on the platform 14, on other portions of the arm assemblies 42, and the like) in which the light assemblies 42 are substantially stationary with respect to the platform 14 when the platform 14 is moved to different elevations. In such embodiments, the light assemblies 42 can be substantially stationary with respect to the platform 14 in substantially the entire range of elevations of the platform 14, in a majority of the range of elevations of the platform 14, or in any other fraction of the range of elevations of the platform 14. Also, in some embodiments, the light assemblies 42 are located on the lift 10 (e.g., on the stanchions 18, on the base 22, and the like) such that the positions of the light assemblies 42 with respect to the platform 14 change when the platform 14 is moved to different elevations.

Also by virtue of their locations on the arm assemblies, the light assemblies 42 in the illustrated embodiment of FIGS. 1-6 are movable with respect to the vehicle when the lift 10 is moved between its stowed and deployed positions. As mentioned above, in other embodiments, the light assemblies 42 are located in other positions (e.g., on the platform 14, on other portions of the arm assemblies 42, and the like) in which the light assemblies 42 are movable with respect to the vehicle when the lift 10 is moved between its stowed and deployed positions. In such embodiments, the light assemblies 42 can be movable with respect to the vehicle 14 in substantially the entire range of positions of the lift 10 between the stowed and deployed positions of the lift 10, in a majority of this range of positions, or in any other fraction of this range of positions.

It is often desirable for the light assemblies 42 to provide a substantially constant intensity, area, and type of illumination in different positions of the lift 10. For example, in those cases where the light assemblies 42 are used to illuminate part or all of the platform 14, it is often desirable for the intensity, area, and type of illumination to be the same at different positions of the lift 10. In some embodiments, the platform 14 translates and/or pivots with respect to other portions of the lift 10. In such cases, the light assemblies 42 can be mounted to move with the platform 14 in any part or all of the range of movement of the platform 14.

In the illustrated embodiment of FIGS. 1-4, the light assemblies 42 are mounted to move with respect to the vehicle when the lift 10 is moved between stowed and deployed positions, such as by mounting the light assemblies 42 upon the arms 24 or other portions of the lift 10 that move with the platform 14 as described above. In this manner, the light assemblies 42 and platform 14 can have a substantially constant positional relationship with respect to one another during at least a portion of the movement of the lift 10. When the platform 14 illustrated in FIGS. 1-4 is in the deployed position shown in FIG. 1, movement of the platform 14 to different vertical positions does not change the positional relationship between the light assemblies 42 and the platform 14, thereby providing a substantially constant intensity, area, and type of illumination of the platform 14. However, in this embodiment, the platform 14 is also pivotable with respect to the arms 24. Therefore, the positional relationship between the light assemblies 42 and the platform 14 changes during part of the movement of the lift 10 (i.e., in pivotal movement of the platform 14 between deployed and stowed positions).

It will be appreciated that the light assemblies 42 can be mounted to other portions of the lift 10 while still maintaining a substantially constant positional relationship with respect to the platform 14 in a portion or all of the range of movement of the lift 10. For example, the light assemblies 42 can be mounted to either or both rails 26, in which case the light assemblies 42 can have a constant positional relationship in all positions of the lift 10.

However, in other embodiments, one or more light assemblies 42 can be mounted to the lift 10 in locations where the light assemblies 42 remain stationary with respect to the vehicle. For example, one or more light assemblies 42 can be mounted to either or both stanchions 18 and/or to the base 22 in the illustrated embodiment of FIGS. 1-4. Such light mounting locations can provide sufficient light to illuminate the platform 14 movable with respect thereto and/or other portions of the lift 10 (e.g., the base 22, areas around the lift 10, and the like).

In some applications, the vehicle structure near the lift 10 can block light from illuminating the platform 14 in one or more platform positions. For example, the floor of the vehicle can block light from within the vehicle, thereby preventing illumination of the platform 14 in one or more platform positions (e.g., when the platform 14 is lowered below the elevation of the vehicle floor). Therefore, in some embodiments one or more light assemblies 42 are mounted in positions that move above and below the elevation of the vehicle floor when the platform 14 is sufficiently raised and lowered, respectively. In the embodiment of FIGS. 1-4, for example, the light assemblies 42 are mounted in positions on the arms 24 so that the light assemblies 42 are moved from an elevation above the vehicle floor and base 22 to an elevation below the vehicle floor and base 22 when the platform 14 is sufficiently lowered. The light assemblies 42 can be mounted in other locations on the lift 10 (described above) while still enabling the light assemblies 42 to move in this manner.

As described above, it is often desirable to place the lift 10 in a stowed position in which the lift 10 occupies a relatively small amount of space in the vehicle. To this end, in some embodiments, light assemblies 42 are mounted in locations in which the light assemblies 42 do not increase the vehicle space needed for the lift 10. In other words, when the lift 10 is in a stowed position, the lift 10 occupies a volume in the vehicle defined by a number of external planes. The light assemblies 42 can be positioned so that the lift 10 occupies substantially the same amount of vehicle space with or without the light assemblies 42. For example, and with reference to FIGS. 3 and 4, the light assemblies 42 can be mounted on the lift 10 so that the outermost surface(s) of the light assemblies 42 do not protrude beyond a plane 48 (see FIG. 3) in which the outermost (outboard) features of the lift 10 lie when the lift 10 is in a fully stowed position. By locating the light assemblies 42 in recessed positions with respect to surrounding lift structure, the light assemblies 42 are less susceptible to damage and do not increase the size of the lift 10.

The embodiment of the illuminated lift 10 illustrated in FIGS. 1-4 provides an example of how electroluminescent (EL) light elements can be used to illuminate one or more parts of the lift 10. In addition to the light assemblies 42 described above, the lift 10 illustrated in FIGS. 1-4 has a pair of EL light elements 50 located on the rails 26 of the platform 14. The EL light elements, together with their electrical connections, are another type of light assembly 42 that can be used in any of the lift embodiments described herein. Only one of the EL light elements 50 is visible in FIGS. 1-4, it being understood that the second EL light element 50 is secured to the opposite rail 26 in a similar location and manner. The EL light elements 50 are strips of light tape adhered to the rails 26, and extend along at least part of the length of the platform 14. Alternatively, the EL light elements 50 can take any other form, including without limitation EL rope, cable, panels, and the like, and can be mounted in any other manner, including without limitation by screws, bolts, clips, clamps, pins, nails, and the like. The EL light elements 50 in the embodiment of FIGS. 1-4 are connected in a conventional manner to electrical wiring (not shown) at the inboard ends of the EL light elements 50. The electrical wiring can run within the arms 24, 16 and links 20 to a power source (not shown). The wiring can be run in any manner described above with reference to the light assemblies 42 mounted on the arms 24, and can be connected to and powered by any conventional power source suitable for EL light elements (e.g., low-voltage DC power provided from a transformer connected to a battery or other vehicle power source). EL light elements and their manner of operation and electrical connection are well known to those in the art and are not therefore described further herein.

The EL light elements 50 can be mounted in any of the locations described above with reference to the light assemblies 42, and can therefore provide the same advantages as the light assemblies 42. However, in some embodiments the EL light elements 50 can be mounted in locations and manners not possible with other types of light elements and assemblies. For example, EL light elements 50 in the form of tape can be mounted on any surface of the lift 10, including surfaces of the inboard and/or outboard barriers 28, 30, other surfaces of the platform 14, surfaces of the base 22, surfaces of the handles 34, and the like. EL light elements 50 in other forms (described above) can be mounted in similar locations. In many cases, the EL light elements 50 can have any shape desired, and can have shapes adapted to the surfaces to which the EL light elements 50 are mounted. For example, light tape can be cut to any shape desired, and can therefore be shaped to cover any part or all of any surface of the lift 10 (such as to cover all inner surfaces of the rails 26, to cover the sides of the stanchions 18, to be wrapped around any part or all of the handles 34, and the like).

The principles of the present invention described above can be applied to any vehicle entry and exit device. For example, one or more light assemblies 42 can be coupled to a one-stanchion lift (not shown) in any of the manners and locations described above. An example of a one-stanchion lift is a lift having substantially the same structure as shown in FIGS. 1-4, but in which only one stanchion 18, arm assembly 12, and actuator 32 are used. The light assemblies 42 as described herein can be used on any other type of one-stanchion lift desired.

Four other illuminated vehicle entry and exit devices are illustrated in FIGS. 7-12. The elements and features of the vehicle entry and exit devices illustrated in FIGS. 7-12 are similar in many ways to elements and features in embodiments described above and illustrated in FIGS. 1-6. Accordingly, the following description focuses primarily upon those elements and features that are different from the embodiments described above. Reference should be made to the above description for additional information regarding the elements, features, and possible alternatives to the elements and features of the lifts illustrated in FIGS. 7-12 and described below. Elements and features of the embodiments shown in FIGS. 7-12 that correspond to elements and features of the embodiments of FIGS. 1-6 are designated hereinafter in the 100, 200, 300, and 400 series of reference numbers, respectively.

Figure 7:
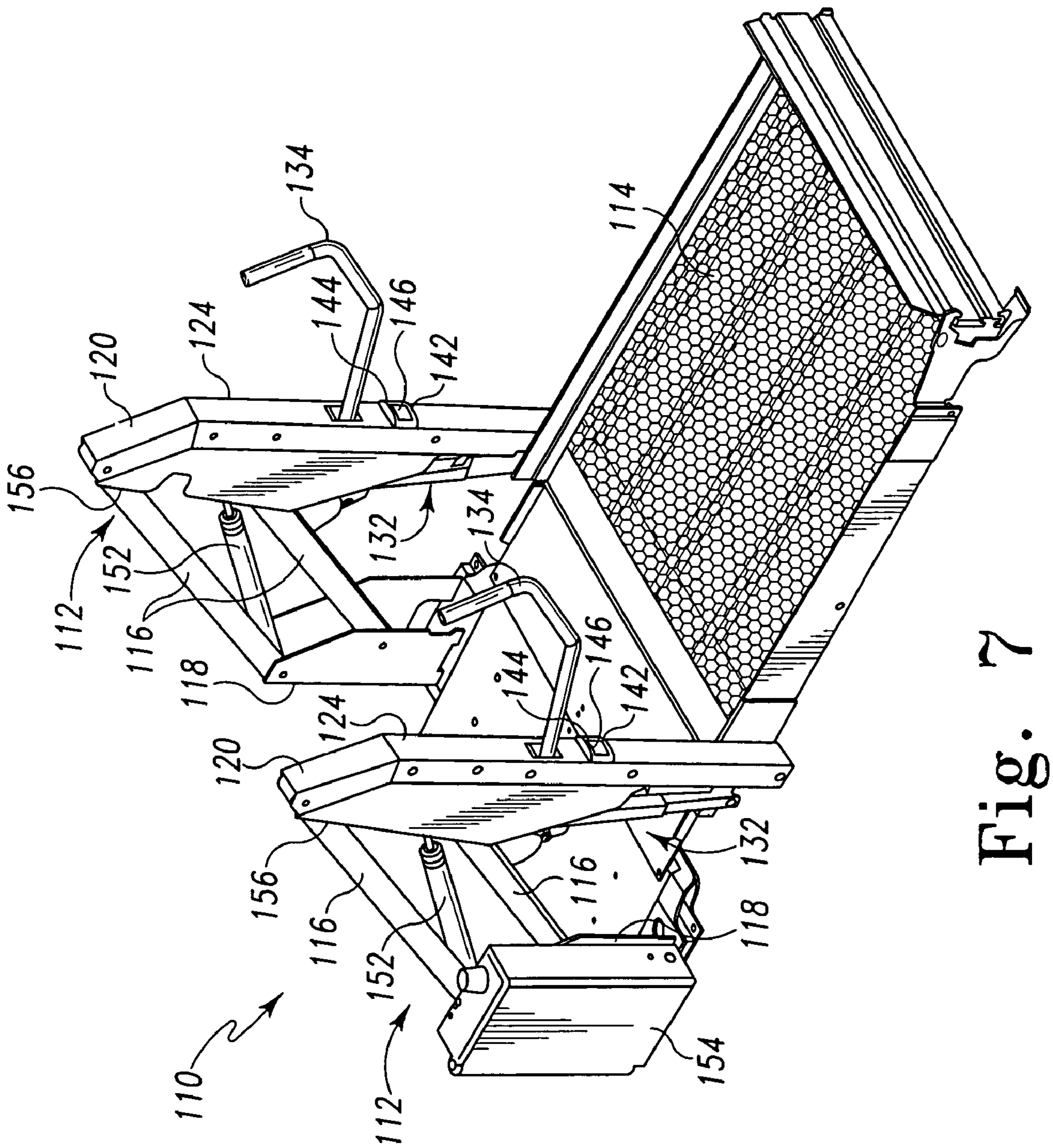
FIG. 7 is a perspective view of another embodiment of a lighted vehicle lift according to the present invention, shown in a deployed position.
Figure 8:
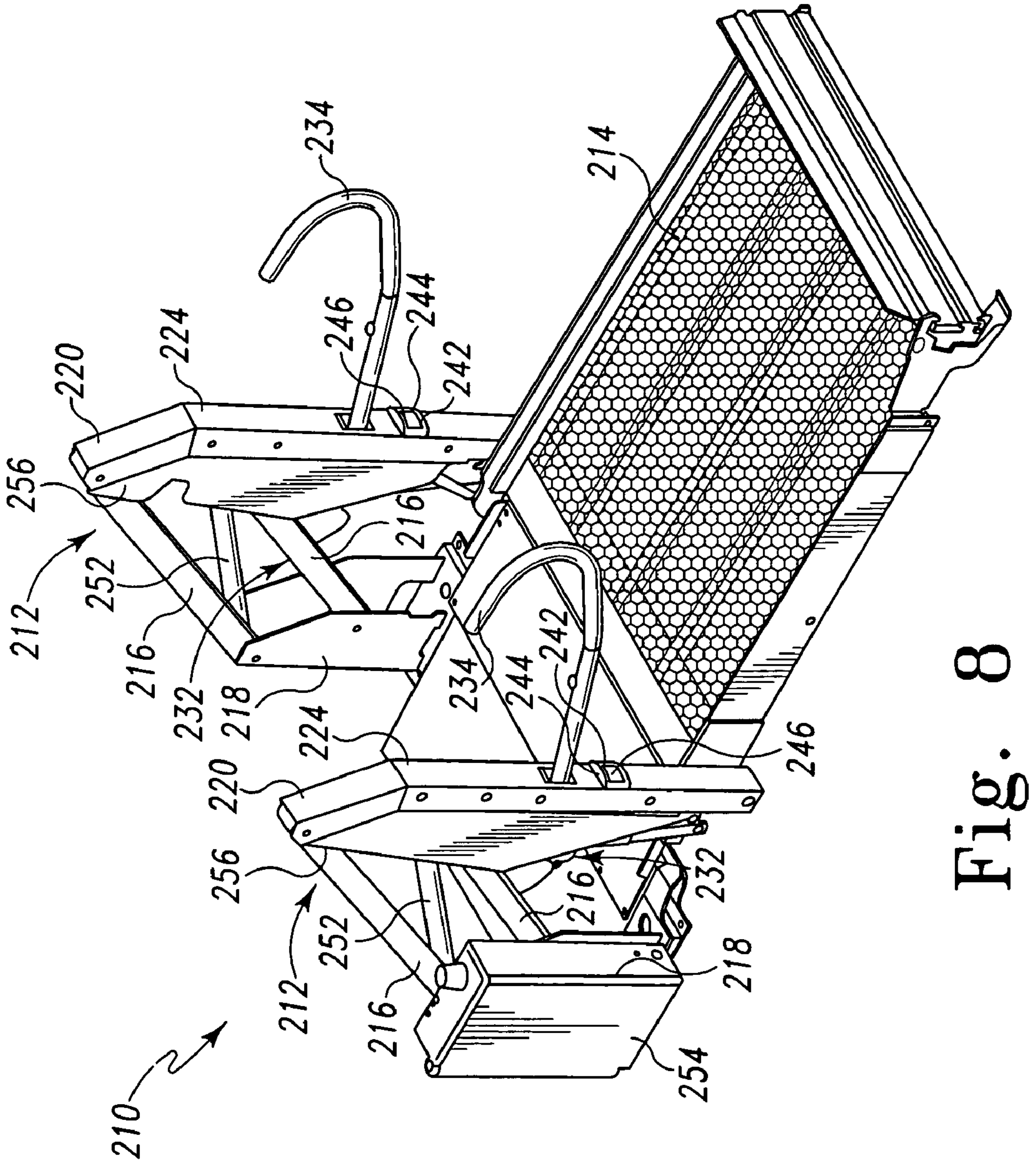
FIG. 8 is a perspective view of another embodiment of a lighted vehicle lift according to the present invention, shown in a deployed position.
Figure 12:
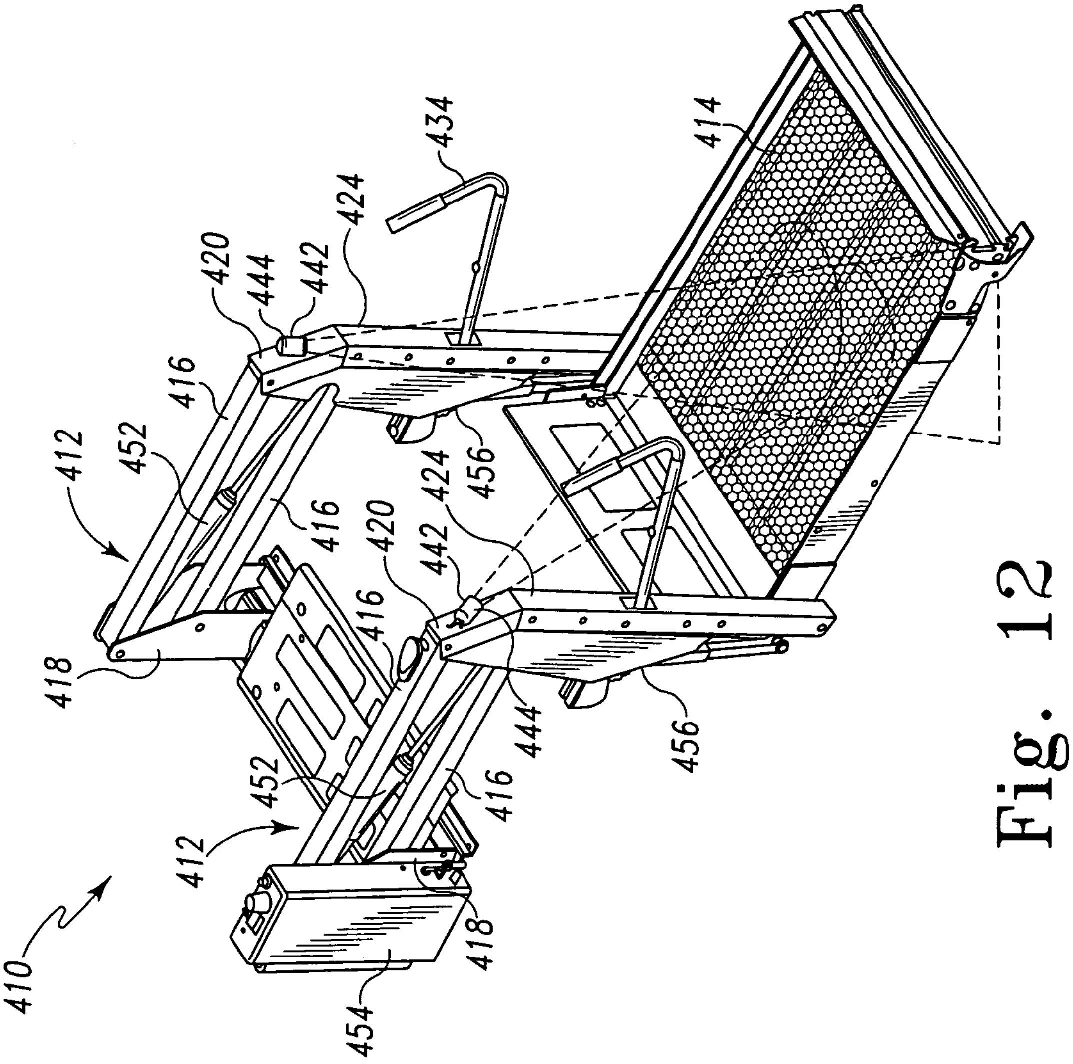
FIG. 12 is a side view of another embodiment of a light assembly according to the present invention.

The lifts 110, 210, 410 illustrated in FIGS. 7, 8, and 12 are powered by hydraulic actuators 152, 252, 452 mounted on the stanchions 118, 218, 418 and coupled to the arm assemblies 112, 212, 412 to move the arms 124, 224, 424 with respect to the vehicle in a conventional manner. Suitable controls for each lift 110, 210, 410 can be housed within a control box 154, 254, 454 such as the control box 154, 254, 454 is mounted to a stanchion 118, 218, 418 as shown in FIGS. 7, 8, and 12. Also, shrouds 156, 256, 456 can be mounted in suitable locations on each lift 110, 210, 410 to protect users and other individuals from moving parts of the lift 110, 210, 410. For example, shrouds 156, 256, 456 are coupled to the arm assemblies 112, 212, 412 in FIGS. 7, 8, and 12, and at least partially enclose the outboard ends of the arms 116, 216, 416 and their connections to the links 120, 220, 420 and to the arms 124, 224, 424 extending to the platform 114, 214, 414. FIGS. 7, 8, and 12 also illustrate different types of handles 134, 234, 434 that can be used with lifts 110, 210, 410. The lift 310 illustrated in FIGS. 9 and 10 is powered in substantially the same manner, employs substantially the same arm assembly components, and moves in substantially the same manner as the embodiment of the lift 10 illustrated in FIGS. 1-4.

Figure 9:
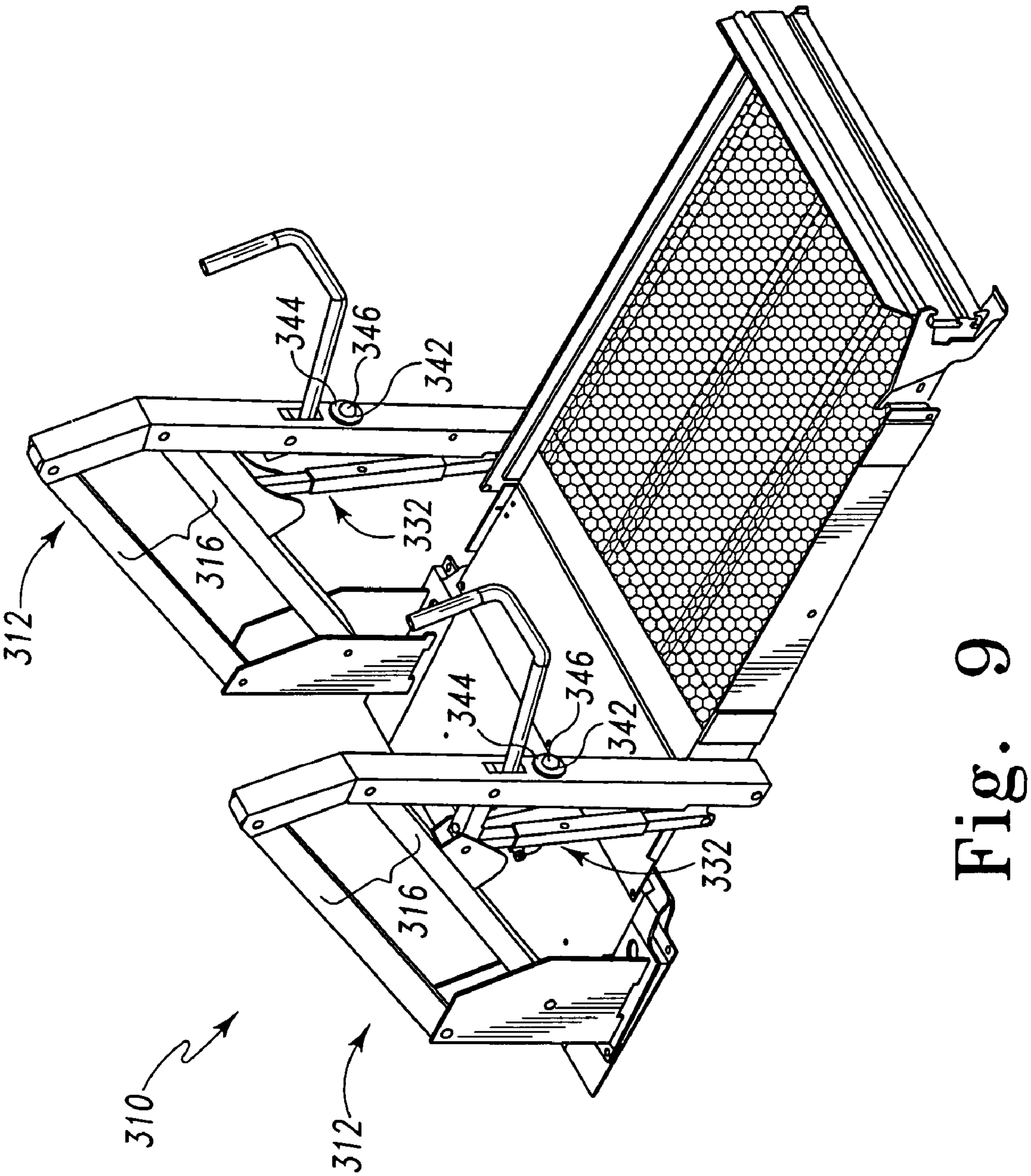
FIG. 9 is a perspective view of another embodiment of a lighted vehicle lift according to the present invention, shown in a deployed position.
Figure 10:
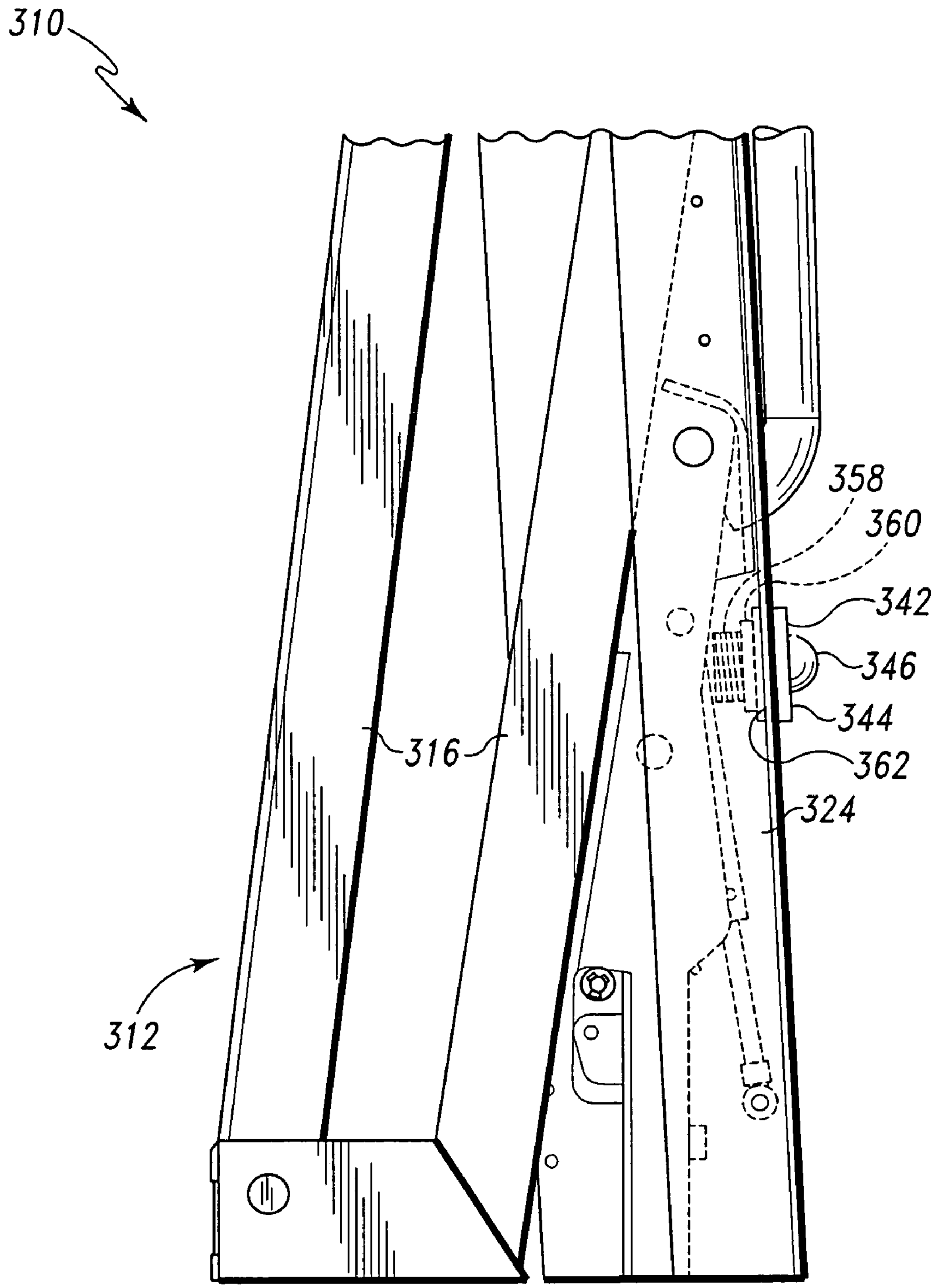
FIG. 10 is a side detail view of the lighted vehicle lift illustrated in FIG. 9.

The lifts 110, 210, 310 illustrated in FIGS. 7-9 are provided with light assemblies 142, 242, 342 mounted upon the arms 124, 224, 324 in a similar manner to the light assemblies 42 in the embodiment of FIGS. 1-4. As described above, the light assemblies 142, 242, 342 can be located in other positions on the lifts 110, 210, 310. By way of example only, the light assemblies 442 illustrated in FIG. 12 are mounted on the links 420 of the arm assemblies 412.

The light assemblies 142, 242 in the embodiments illustrated in FIGS. 7 and 8 have a relatively low profile, and in some embodiments can have smaller light elements (e.g., halogen bulbs) within their housings 144, 244. Also, the lenses 146, 246 of the light assemblies 142, 242 are shaped to cast light upon the areas surrounding the lift 110, 210 as well as upon the platform 114, 214. In the embodiments of FIGS. 7 and 8, the housing 144, 244 has a lens 146, 246 with an arcuate cross-sectional shape to provide this type of illumination. In the embodiment of FIGS. 9 and 10, the housing 344 has a semi-spherical lens 346 for this same purpose. The lens 346 can have a mirrored exterior surface as best shown in FIG. 10. Such a mirrored surface can be employed on any of the light assembly lenses described herein. Yet another type of light assembly 442 is illustrated in FIG. 12. Such light assemblies 442 have housings external to the arm assemblies 412, and can be mounted to the arm assemblies 412 in any manner desired. In some embodiments, one or more of the light assemblies 442 (and any of the other light assemblies described and illustrated herein) are adjustable to change the illuminated locations on or adjacent the lift 410. With reference to the embodiment of FIG. 12, the housings of the light assemblies 442 can be rotated in one or more manners for this purpose.

Figure 11:
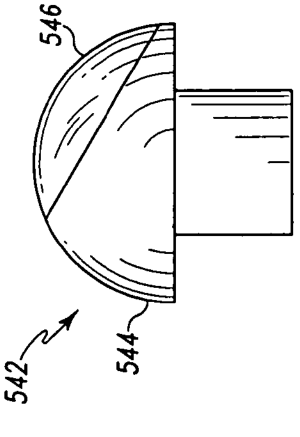
FIG. 11 is a perspective view of another embodiment of a lighted vehicle lift according to the present invention, shown in a deployed position.

As mentioned above, in some embodiments, light assemblies adapted to cast light only in certain directions or ranges of directions can be used. An example of such a light assembly 10 is described above with reference to the lift embodiment illustrated in FIGS. 1-4 (see also, FIGS. 5 and 6). Another example of such a light assembly is illustrated in FIG. 11, which illustrates a light assembly 542 having a semi-spherical housing 544 with a partially-spherical lens 546 positioned to permit light to exit the housing 544 only in forward and side directions, thereby illuminating the platform 14, 114, 214, 314, 414 and an area adjacent the platform 14, 114, 214, 314, 414 but not areas remote from the platform 14, 114, 214, 314, 414. The lenses 46, 146, 246, 346, 546 in any of the embodiments described above can be adapted to permit light to exit the housing 44, 144, 244, 344, 444, 544 in any range desired, depending at least in part upon the selected shape, size, and position of the lens 46, 146, 246, 346, 546 with respect to the housing 44, 144, 244, 344, 444, 544.

FIG. 10 illustrates a manner in which a light assembly 342 can be mounted to the lift 310. The light assembly 342 illustrated in FIG. 10 has a housing 344 that includes a rearwardly-depending threaded portion 358 upon which can be threaded a nut 360. The housing 344 can also have a rear face 362 that can be positioned to abut a surface in which the housing 344 is received (e.g., material about an aperture in the surface). Accordingly, the nut 360 can be threaded upon the housing 344 to trap a portion of the lift 310 between the nut 360 and the surface 362, thereby securing the light assembly 342 to the lift 310. In other embodiments, the light assembly 342 can be secured to the lift 310 in any other manner, such as by screws, nuts and bolts, rivets, pins, and other conventional fasteners, adhesive or cohesive bonding material, snap-fits, inter-engaging elements, and the like, and can be mounted to extend within an aperture of the lift 310 or only upon an exterior surface of the lift 310.

Another illuminated lift is illustrated in FIGS. 13-18. The elements and features of the vehicle entry and exit device illustrated in FIGS. 13-18 are similar in many ways to elements and features in embodiments described above and illustrated in FIGS. 1-12. Accordingly, the following description focuses primarily upon those elements and features that are different from the embodiments described above. Reference should be made to the above description for additional information regarding the elements, features, and possible alternatives to the elements and features of the lift illustrated in FIGS. 13-18 and described below. Elements and features of the embodiment shown in FIGS. 13-18 that correspond to elements and features of the embodiments of FIGS. 1-12 are designated hereinafter in the 600 series of reference numbers.

Figure 17:
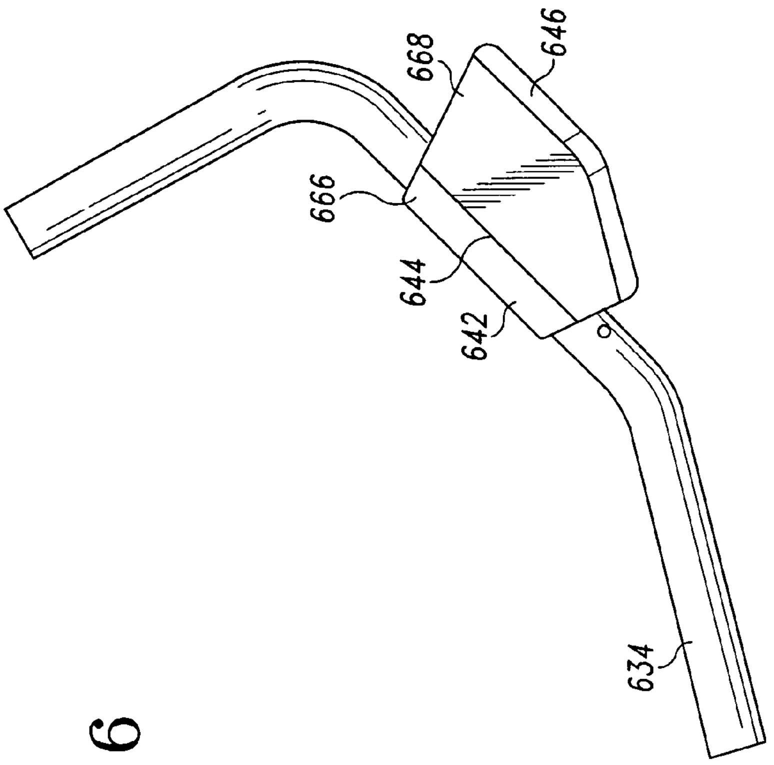
FIG. 17 is a side detail view of the lighted vehicle lift illustrated in FIGS. 13-16.
Figure 16:
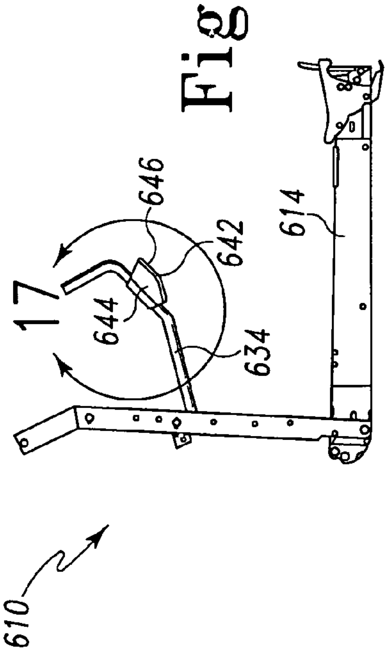
FIG. 16 is a side view of a portion of the lighted vehicle lift illustrated in FIGS. 13-15, shown in a deployed position.
Figure 18:
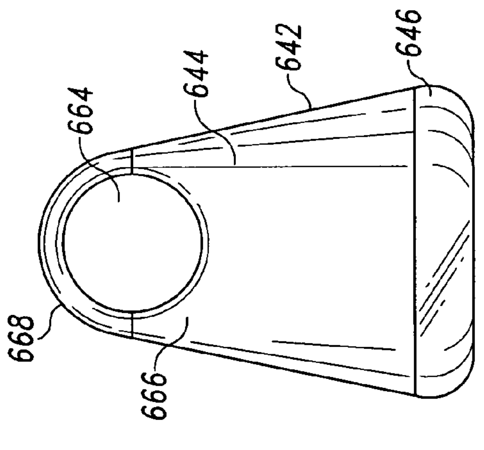
FIG. 18 is a top view of the light assembly of the lighted vehicle lift illustrated in FIGS. 13-17.

The lift 610 illustrated in FIGS. 13-18 has a pair of light assemblies 642 coupled to the handles 634 of the lift 610. In some embodiments, and as best shown in FIGS. 17 and 18, the light assemblies 642 each include a housing 644 at least partially enclosing one or more light elements (not shown), and a lens 646 through which light can escape the housing 644. The light assemblies 642, housing 644, lens 646, and light elements can take any of the forms (and alternatives thereto) and can be mounted in any of the manners described above with reference to the illuminated lift embodiments illustrated in FIGS. 1-12. In the embodiment of FIGS. 13-18, the each light assembly 642 is attached to a handle 634 of the lift 610 by receiving the handle 634 through an aperture 664 of the housing 644. With reference to FIGS. 17 and 18, the aperture 664 can be defined by two parts 666, 668 of the housing 644 coupled together about the handle 634. In such cases, the parts 666, 668 of the housing 644 can be permanently or releasably coupled together in any manner, such as by screws, nuts and bolts, rivets, pins, and other conventional fasteners, adhesive or cohesive bonding material, snap-fits, inter-engaging elements, and the like.

In other embodiments, the light assemblies 642 can be coupled to the handles 634 in other manners, such as by screws, bolts, rivets, pins, and other conventional fasteners passed through apertures in the housing 644 and handles 634, by clamps on the housing 644 coupled to the handles 634 (or vice versa), by screws, bolts, rivets, pins, and other conventional fasteners connecting flanges, bosses, brackets, or other mounting elements on the housing 644 and/or handles 634, by welding or brazing, by adhesive or cohesive bonding material, and the like. Still other manners of permanently and releasably coupling the light assemblies 642 to the handles 634 are possible, and fall within the spirit and scope of the present invention.

Figure 13:
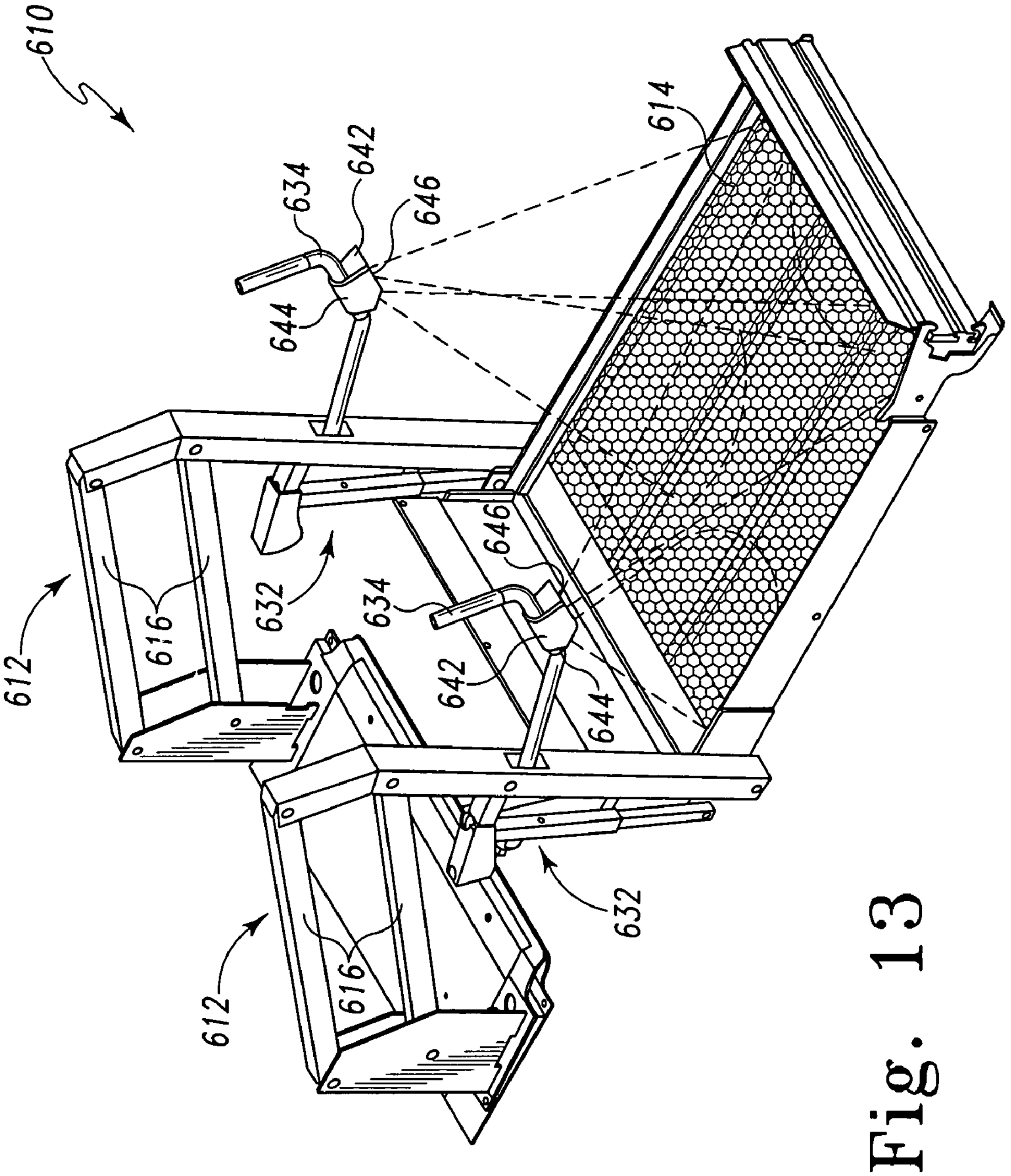
FIG. 13 is a perspective view of another lighted vehicle lift according to the present invention, shown in a deployed position.
Figure 14:
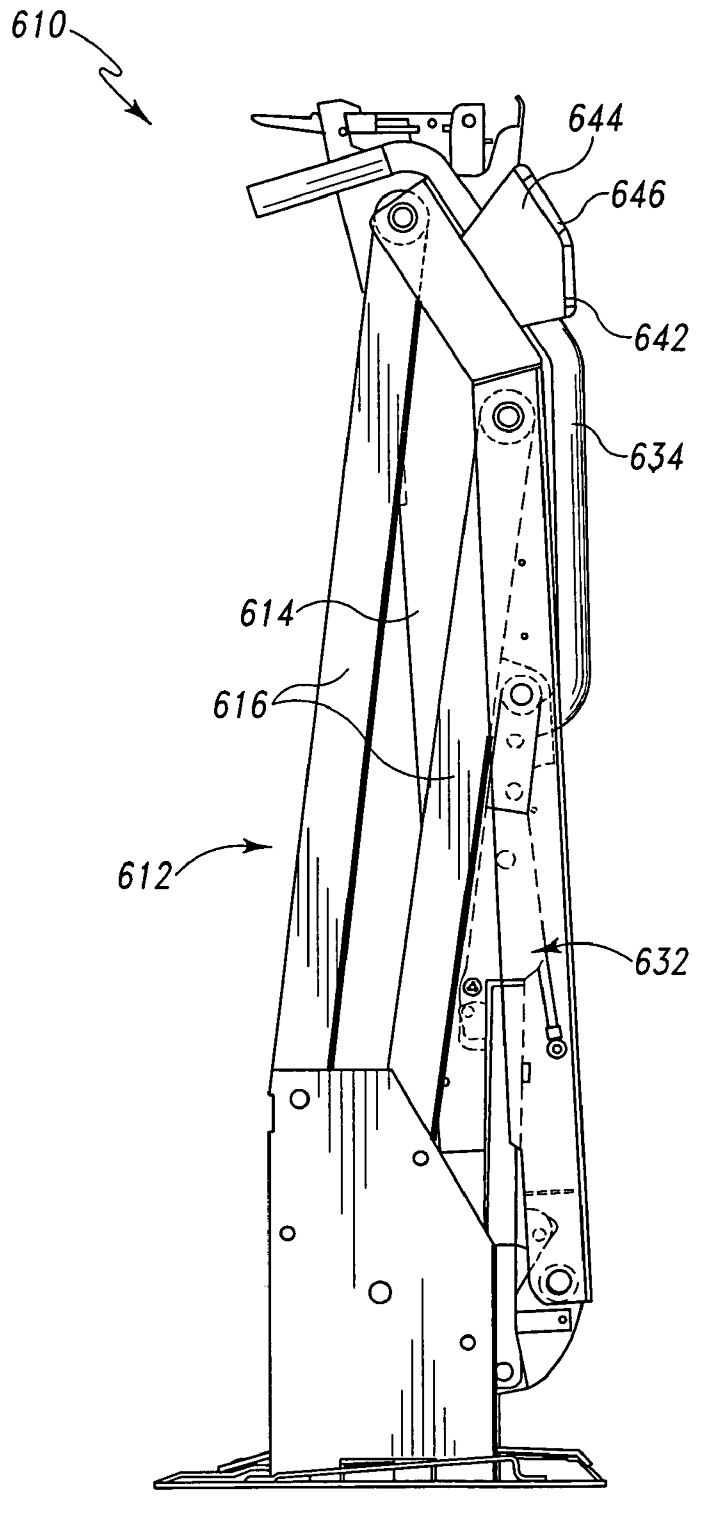
FIGS. 14 and 15 are side views of the lighted vehicle lift illustrated in FIG. 13, shown in a stowed position.
Figure 15:
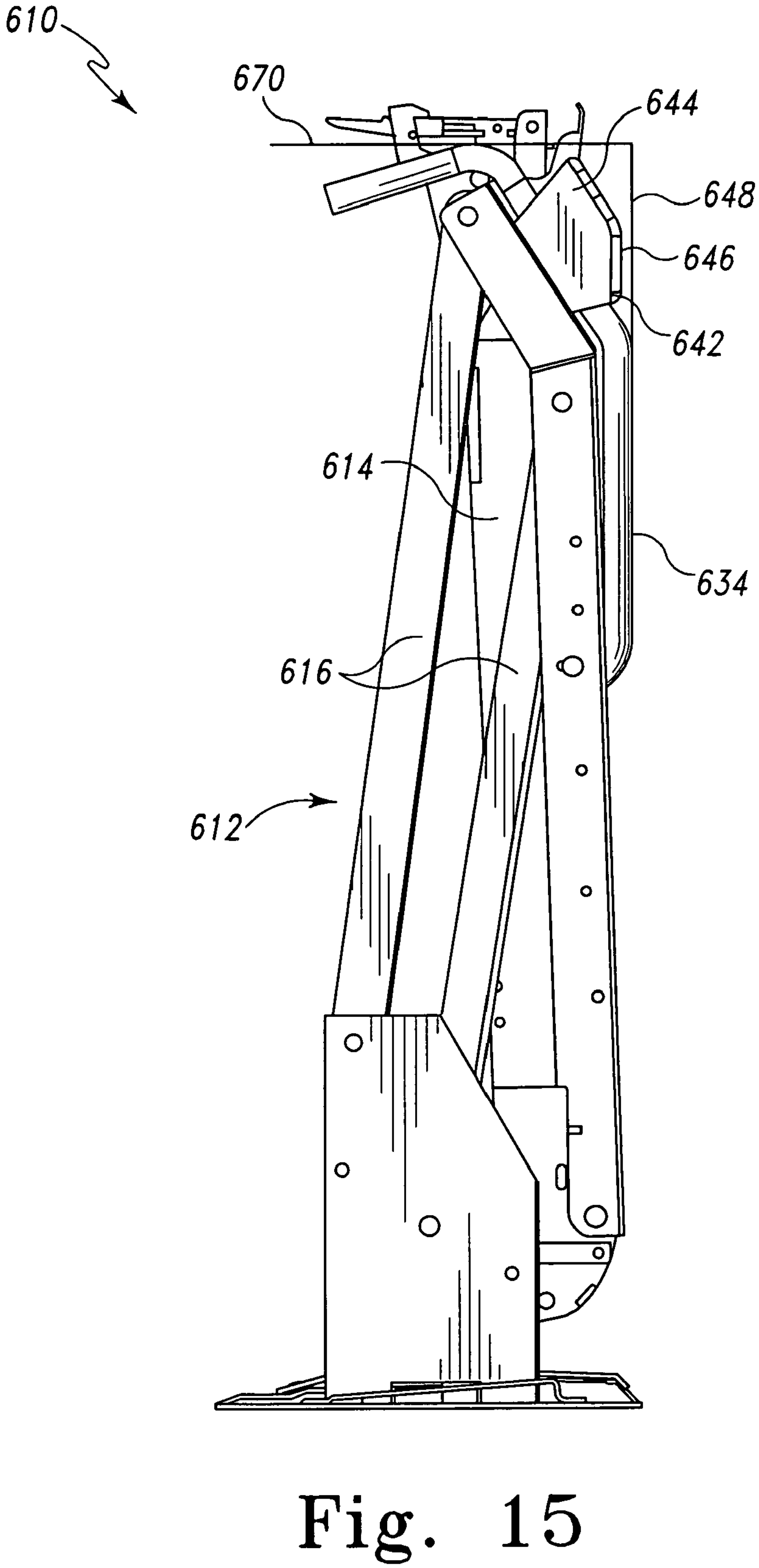

The light assemblies 642 in the embodiment of FIGS. 13-18 can be coupled anywhere along the handles 634, and in some embodiments are coupled to portions of the handles 634 that are non-horizontal when the lift 610 is in a deployed position (see FIG. 13, for example). Also or instead, the light assemblies 642 can be shaped so that light is cast in a range of directions to illuminate any portion(s) of the lift 610. For example, the lenses 646 of the light assemblies 642 illustrated in FIGS. 13-18 have two portions disposed at an angle with respect to one another, thereby concentrating light in two primary directions in order to illuminate different sections of the platform 614. In the embodiment of FIGS. 13-18 (as well as in the other illuminated lift embodiments described herein), each lens 646 can have any number of different surfaces disposed at angles with respect to one another in order to concentrate light in different directions. In other embodiments, the other types of light assemblies described above that are capable of directing light in desired ranges of locations can be employed.

Each of the light assemblies 642 illustrated in FIGS. 13-18 can be powered by electrical wiring extending from the housing 644, into an aperture (not shown) in the handle 634 to which the light assembly 642 is mounted, along and inside the handle 634, and through the arm assemblies 612 as described in greater detail above.

By coupling the light assemblies 642 to the handles 634 as described above, the light assemblies 642 can be positioned over the platform 614 or immediately adjacent and at a higher elevation than the platform 614, thereby providing effective illumination of the platform 614 below without interference with other parts of the lift 610 (and despite the presence of individuals or objects on the platform 614). Also, because the handles 634 in some embodiments are substantially stationary with respect to the platform 614 in a range of positions of the platform 614 as described above, the light assemblies 642 can provide a substantially constant intensity, type, and area of illumination in a range of vertical positions of the platform 614.

As also described above, it is often desirable to place the lift 610 in a stowed position in which the lift 610 occupies a relatively small amount of space in the vehicle. To this end, the light assemblies 642 can be coupled to the handles 634 in locations in which the light assemblies 642 do not increase the vehicle space needed for the lift 610. In other words, when the lift 610 is in a stowed position, the lift 610 occupies a volume in the vehicle defined by a number of external planes. The light assemblies 642 can be positioned so that the lift 610 occupies substantially the same amount of vehicle space with or without the light assemblies 642. For example, and with reference to FIG. 15, the light assemblies 642 can be mounted to the handles 634 so that the outermost surface(s) of the light assemblies 642 do not protrude beyond a front plane 648 and a top plane 670 in which the outermost (outboard) and top features of the lift 610 lie when the lift 610 is in a fully stowed position. By locating the light assemblies 642 in recessed positions with respect to surrounding lift structure, the light assemblies 642 are less susceptible to damage and do not increase the size of the lift 610.

Figure 19:
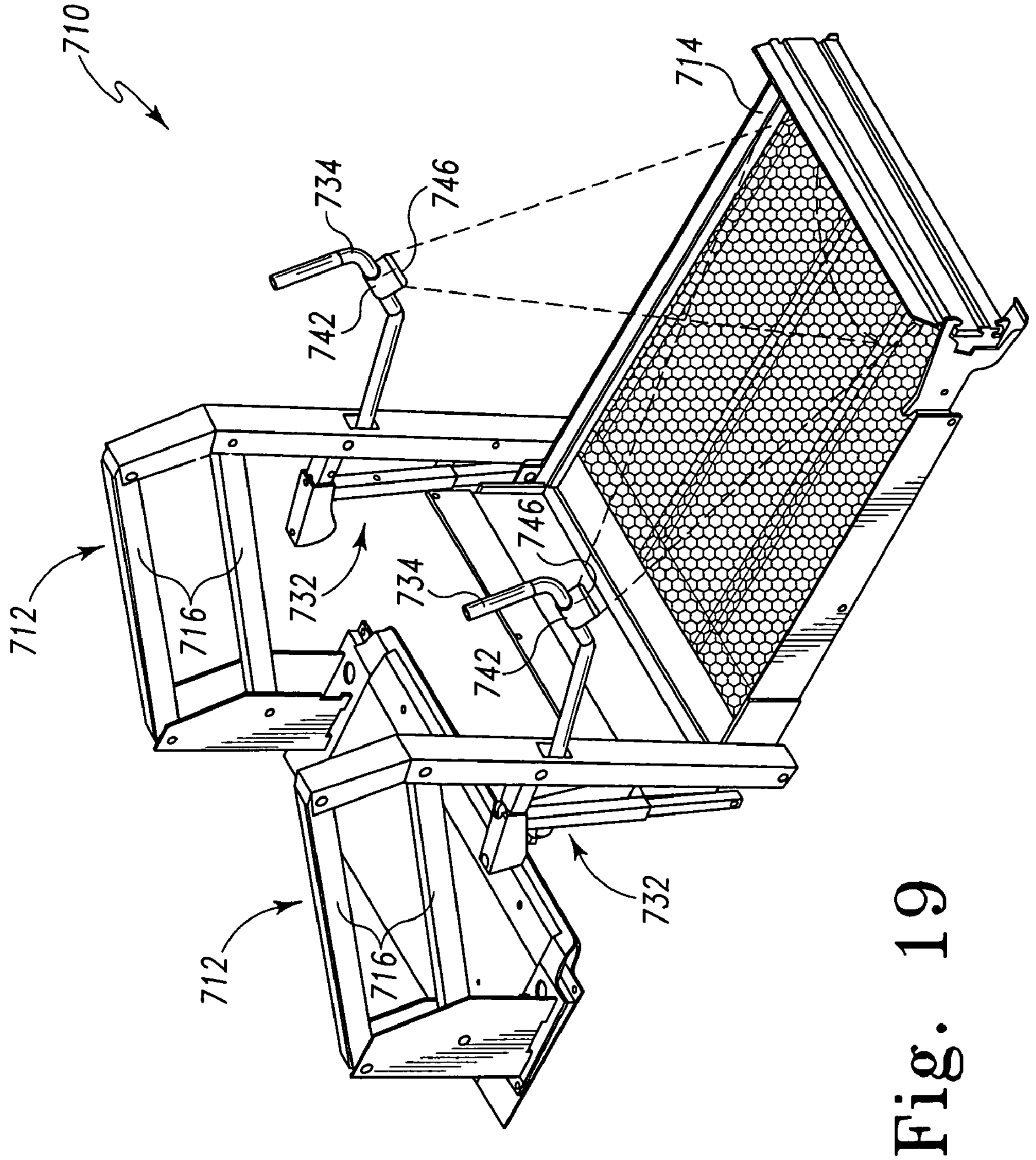
FIG. 19 is a perspective view of yet another lighted vehicle lift according to the present invention, shown in a deployed position.

Yet another illuminated lift is illustrated in FIG. 19. With the exception of the light assemblies, this embodiment is substantially the same as the embodiment illustrated in FIGS. 13-18 and described above. Accordingly, reference should be made to the above description for additional information regarding the elements, features, and possible alternatives to the elements and features of the lift illustrated in FIG. 19 and described below. Elements and features of the embodiment shown in FIG. 19 that correspond to elements and features of the embodiments of FIGS. 13-18 are designated hereinafter in the 700 series of reference numbers.

The light assemblies 742 illustrated in FIG. 19 are mounted and powered in the same locations and manners as described above with reference to the embodiment of FIGS. 13-18. However, the light assemblies 742 in FIG. 19 are shaped to cast light in a single direction, and have lenses 746 that are shaped for this purpose. Although lenses 746 having other shapes can perform this same function, the lenses 746 illustrated in FIG. 19 are substantially flat. Like the embodiment illustrated in FIGS. 13-18, the light assemblies 742 can be coupled to the handles 734 in any position desired, thereby enabling the light assemblies 742 to illuminate any portion of the lift 710 or lift environment (e.g., the entire platform 714, only a front or rear portion of the platform 714, areas around the platform 714, and the like).

The embodiments described above and illustrated in the figures are presented by way of example only and are not intended as a limitation upon the concepts and principles of the present invention. As such, it will be appreciated by one having ordinary skill in the art that various changes in the elements and their configuration and arrangement are possible without departing from the spirit and scope of the present invention.

For example, the lifts 10, 110, 210, 310, 510, 610, 710 illustrated in the accompanying figures have two or four light assemblies 42, 142, 242, 342, 442, 542, 642, 742 located as described above. The number of light assemblies 42, 142, 242, 342, 442, 542, 642, 742 in each illustrated embodiment is presented by way of example only. It should be noted that in each of the illuminated lift embodiments described herein and illustrated in the figures, any number of light assemblies 42, 142, 242, 342, 442, 542, 642, 742 can be used.

As another example, the lifts 10, 110, 210, 310, 510, 610, 710 described above and illustrated in the figures each have actuators 32, 132, 232, 332, 432, 532, 632, 732 that cam against arms 16, 116, 216, 316, 516, 616, 716 of the arm assemblies 12, 112, 212, 312, 512, 612, 712 and thereby cause the platform 14, 114, 214, 314, 514, 614, 714 and the handles 34, 134, 234, 334, 534, 634, 734 to pivot between stowed and deployed positions. However, it will be appreciated that the platform 14, 114, 214, 314, 514, 614, 714 and handles 34, 134, 234, 334, 534, 634, 734 can be pivoted in a number of other manners, including without limitations by dedicated actuators (e.g., hydraulic or pneumatic pistons, solenoids, electric motors, and other actuator types), by other types of mechanical connections to the platform 14, 114, 214, 314, 514, 614, 714 and/or handles 34, 134, 234, 334, 534, 634, 734 and the like. All such alternative manners of pivoting the platform 14, 114, 214, 314, 514, 614, 714 and/or handles 34, 134, 234, 334, 534, 634, 734 are possible, and fall within the spirit and scope of the present invention.

We claim:

1. A vehicle access apparatus coupled to and movable with respect to a vehicle for user entry into and exit from the vehicle, the vehicle access apparatus comprising:

a platform;

a linkage assembly moveably coupling the platform to the vehicle;

an actuator coupled to the linkage assembly and operable to move the linkage assembly and the platform with respect to the vehicle, the platform moveable between a lowered position and a raised position, and between the raised position and a stowed position; and a light mounted on the linkage assembly for movement therewith and positioned to illuminate at least part of the platform during movement of the platform, wherein an orientation of the light is substantially fixed with respect to the platform during movement of the platform between the lowered and raised positions, and wherein an orientation of the light changes with respect to the platform during movement of the platform between the raised and deployed positions.

2. The vehicle access apparatus as claimed in claim 1, wherein the linkage assembly includes an arm coupled to the platform and the actuator, the arm movable by the actuator to move the platform, wherein the light is located on the arm.

3. The vehicle access apparatus as claimed in claim 1, wherein the linkage assembly includes at least one handle positioned to be grasped by a user on the platform, wherein the light is mounted to the handle.

4. The vehicle access apparatus as claimed in claim 3, wherein the light is located at a higher elevation than the handle.

5. The vehicle access apparatus as claimed in claim 3, wherein the light is located at a lower elevation than the handle.

6. The vehicle access apparatus as claimed in claim 1, further comprising a housing in which the light is at least partially received, the housing shaped to restrict emission of light in at least one direction from the housing.

7. The vehicle access apparatus as claimed in claim 1, wherein the light is adjustable to illuminate different parts of the vehicle access apparatus.

8. The vehicle access apparatus as claimed in claim 1, wherein:

the vehicle access apparatus has an inboard side facing substantially away from an interior of the vehicle and an outboard side facing substantially toward the interior of the vehicle when the vehicle access apparatus is in the stowed position; and the light is located substantially entirely on an inboard side of a plane defined by the outboard side of the vehicle access apparatus.

9. The vehicle access apparatus as claimed in claim 1, wherein the light comprises a light bulb.

10. The vehicle access apparatus as claimed in claim 1, wherein the light comprises an electroluminescent light element.

11. The vehicle access apparatus as claimed in claim 1, further comprising a substantially elongated electroluminescent light strip mounted on the platform.

12. A method of illuminating a platform of a vehicle access apparatus coupled to and movable with respect to a vehicle for user entry into and exit from the vehicle, the method comprising:

supplying power to a light coupled to the vehicle access apparatus;

illuminating at least part of the platform with the light;

moving the platform with respect to the vehicle between a stowed position, a deployed position, and an intermediate position;

moving the light together with the platform while moving the platform between the deployed position and the intermediate position in order to maintain illumination of the platform; and moving the platform relative to the light while moving the platform between the intermediate position and the stowed position.

13. The method of claim 12, further comprising coupling the light to a linkage assembly of the vehicle access apparatus for movement with the linkage assembly during motion of the vehicle access apparatus with respect to the vehicle.

14. The method of claim 13, wherein coupling the light to the linkage assembly comprises coupling the light to an arm of the linkage assembly that moves the platform with respect to the vehicle.

15. The method as claimed in claim 12, wherein moving the platform between the deployed and intermediate positions includes changing an elevation of the platform.

16. The method as claimed in claim 15, wherein changing an elevation of the platform includes maintaining the platform in a substantially parallel relationship with respect to a floor of the vehicle.

17. The method as claimed in claim 12, wherein moving the light together with the platform includes maintaining a positional relationship of the light with respect to the platform while moving the platform between the intermediate position and the deployed position.

18. The method as claimed in claim 12, further comprising restricting emission of light in at least one direction.

19. The method as claimed in claim 12, further comprising adjusting the light to illuminate different parts of the platform.

* * * * *